July 31, 1962 W. K. DICK 3,047,023
GAS-CHARGED ACCUMULATOR-RESERVOIR UNIT
Filed June 26, 1959
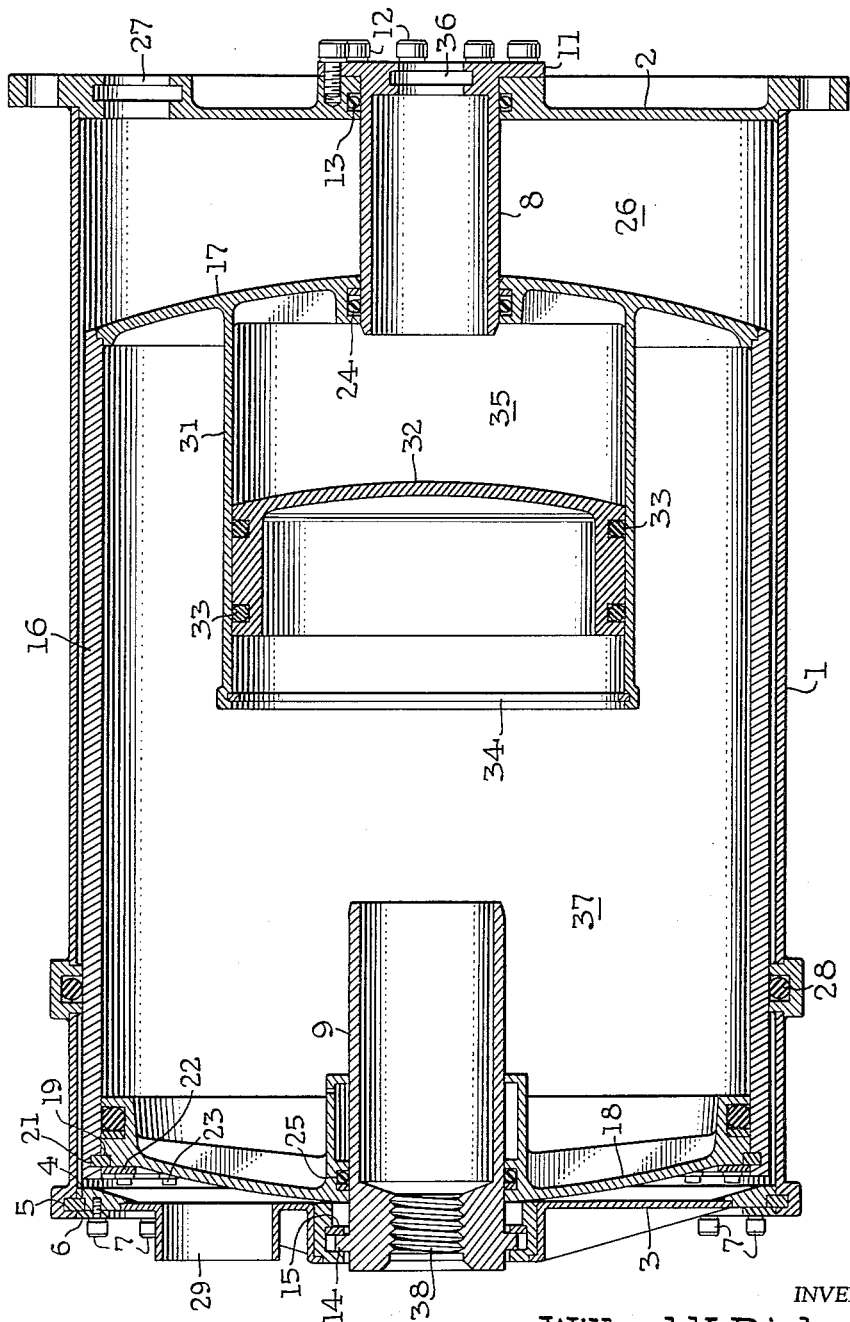
INVENTOR
Willard K. Dick
BY Dodge and Sons
ATTORNEYS

United States Patent Office 3,047,023
Patented July 31, 1962

3,047,023
GAS-CHARGED ACCUMULATOR-RESERVOIR UNIT
Willard K. Dick, Watertown, N.Y., assignor to The New York Air Brake Company, a corporation of New Jersey
Filed June 26, 1959, Ser. No. 823,234
3 Claims. (Cl. 138—31)

This invention relates to hydraulic accumulator-reservoir units of the gas-charged type in which a single gas chamber serves to pressurize both the accumulator and the reservoir.

The object of this invention is to provide an accumulator-reservoir unit of this type having the following features and advantages:

(1) The accumulator and reservoir ports are located at one end of the unit. This is a desirable feature because it eliminates the need for external piping in those installations where the unit is attached to a manifold which provides hydraulic interconnections with the other system components.

(2) The length-to-width ratio is relatively small so cantilever mounting is feasible even in those environments subject to large shock and vibration loads.

(3) The gas-charging port is located at the end of the unit opposite the hydraulic ports so that the access space required along the sides of the unit is a minimum.

(4) The gas chamber is relatively large. As a result, accumulator pressure remains substantially constant as the accumulator discharges.

(5) The parts are so arranged that the volumes of the reservoir and accumulator chambers may be changed independently of each other.

The preferred embodiment of the invention will now be described in detail with reference to the accompanying drawing which is an axial sectional view of the unit.

As shown in the drawing, the accumulator-reservoir unit comprises an outer cylindrical casing 1, of circular shape in transverse cross-section, whose right end is closed and sealed by a transverse wall 2 which is welded to the casing. At its left end, the casing 1 is provided with a transverse wall 3 having a shoulder 4 which engages a snap ring 5 mounted in an annular groove formed in the casing 1. The wall 3 is clamped in place against snap ring 5 by an annular retainer plate 6 and bolts 7. Projecting into the casing 1 through axial openings formed in the walls 2 and 3 are two tubular members 8 and 9, respectively, having different outside diameters; the tubular member 9 being the larger of the two. The member 8 is formed with an integral flange 11 which is attached to the wall 2 by bolts 12. Leakage along the outer periphery of tubular member 8 is prevented by resilient O-ring 13. The tubular member 9 carries a shoulder 14 which is received within an annular groove formed in wall 3 and is held against one radial face of that groove by snap ring 15.

Slidable within casing 1 is a coaxial cylindrical casing 16, also of circular shape in transverse cross-section, whose opposite ends are closed and sealed by circular transverse end walls 17 and 18; the wall 17 being welded to the casing 16 and the wall 18 being attached by means of shoulder 19, snap ring 21, annular retainer plate 22 and bolts 23 in the same manner as that employed in connection with wall 3 and casing 1. The walls 17 and 18 are formed with axial openings which form a snug sliding fit with tubular members 8 and 9. Resilient O-rings 24 and 25 prevent leakage into or out of casing 16 through these openings. The casing 16 is considerably shorter than the casing 1 so that walls 2 and 17, tubular member 8, and casing 1 define an annular space 26 which is the reservoir chamber. This chamber is provided with a port 27 and is sealed by resilient O-rings 13, 24 and 28. The space within casing 1, between end walls 3 and 18, is vented to atmosphere through port 29.

Projecting inward into casing 16 is a coaxial circular cylinder 31 which is formed as an integral part of the wall 17. Reciprocable within this cylinder is a piston 32 which forms a snug sliding fit with the cylinder and is sealed against leakage by a pair of O-ring seals 33. Movement of piston 32 to the left, relatively to cylinder 31, is limited by snap ring 34. The space 35 within cylinder 31 and bounded by wall 17 and piston 32 is the accumulator chamber and it communicates with the accumulator port 36 through the interior of tubular member 8. The remaining space 37 within casing 16 is the gas-charge chamber and this space communicates with the gas-charging port 38 through the interior of tubular member 9.

In operation, the accumulator and reservoir ports 36 and 27, respectively, are connected with the hydraulic system through passages in the manifold (not shown) to which the unit is attached, and the chamber 37 is charged with gas through the port 38. The pressurized gas in chamber 37 acts upon the entire cross-sectional area of piston 32 and therefore the hydraulic fluid in chamber 35 is under the same pressure as the gas in chamber 37.

The gas in chamber 37 also acts on the front and rear walls 17 and 18; the wall 18 and that portion of wall 17 between casing 16 and cylinder 31 being subject to the direct action of the gas, and the remaining portion of wall 17 being subject to indirect action through the medium of piston 32 and the hydraulic fluid in chamber 35. The effective area of wall 17 is greater than the effective area of wall 18 (because of the difference in the outside diameters of tubular members 8 and 9) and so the gas in chamber 37 exerts a net force on casing 16 urging that casing to the right. This force pressurizes the fluid in reservoir chamber 26 and, since the cross-sectional area of the wall 17 is much greater than the difference between the cross-sectional areas of tubular members 8 and 9, the reservoir pressure will be considerably less than the accumulator pressure.

It should be observed that when fluid is withdrawn from the reservoir chamber 26, the casing 16 will move to the right thereby forcing tubular member 8 into the accumulator chamber 35. The fluid displaced by this member forces piston 32 to the left toward snap ring 34. This shift of piston 32 increases the volume of the accumulator chamber 35 the same amount and at the same rate as the volume is decreased by movement of casing 16. Because of this interrelationship between the reservoir volume and the accumulator volume, it is essential when charging the unit to make certain that the circuit demands are such that piston 32 will be in abutment with snap ring 34 only when the reservoir volume is a minimum.

As stated previously, the drawing and description relate only to a preferred embodiment of the invention. Since many changes can be made in the structure of this embodiment without departing from the inventive concept, the following claims should provide the sole measure of the scope of the invention.

What is claimed is:

1. A gas-charged reservoir and accumulator unit comprising a first casing having a cylindrical wall and a front transverse end wall fixed to and closing one end of the cylindrical wall; a rear transverse end wall fixed to the opposite end of the first casing; tubes, one carried by each end wall of the first casing and each projecting into the casing, the cross-sectional areas of the tubes being unequal and the tube carried by the front wall having the smaller area; a second casing reciprocable within the first casing and having a cylindrical wall and front and rear transverse end walls fixed to and closing the opposite ends of its cylindrical wall, each transverse end wall of the second casing having an opening through which one of the tubes projects, the second casing being shorter than the first casing so that the front walls of the two casings and a portion of the outer periphery of one of the tubes define a variable volume annular reservoir chamber within the first casing; a third casing located within the second casing and having a cylindrical wall and front and rear transverse end walls closing the opposite ends of its cylindrical wall, one of the transverse end walls of the third casing being carried by the front transverse end wall of the second casing and the other transverse end wall of the third casing being movable relatively to said front transverse end wall of the second casing along the longitudinal axis of the third casing and subject to the pressure in the second casing, the cylindrical wall of the third casing being fixed to only one of the end walls whereby a variable volume accumulator chamber is defined within the third casing, the front transverse end wall of the third casing having an opening through which the tube carried by the front transverse end wall of the first casing projects; an accumulator port formed in the front wall of the first casing and leading into the tube carried by that wall; a reservoir port formed in the first casing and communicating with the reservoir chamber; and a gas-charging port formed in the rear wall of the first casing and leading into the tube carried by that wall, the cylindrical walls of the three casings and the two tubes being coaxial.

2. The invention defined in claim 1 in which the reservoir port is formed in the front wall of the first casing.

3. The invention defined in claim 1 in which the cylindrical walls of the three casings and the two tubes are of circular shape in transverse cross-section.

References Cited in the file of this patent
UNITED STATES PATENTS

| | | |
|---|---|---|
| 2,745,357 | Strayer | May 15, 1956 |
| 2,747,370 | Traut | May 29, 1956 |